US010394777B2

(12) United States Patent
Yu et al.

(10) Patent No.: US 10,394,777 B2
(45) Date of Patent: Aug. 27, 2019

(54) FAST ORTHOGONAL PROJECTION

(71) Applicant: Google LLC, Mountain View, CA (US)

(72) Inventors: Xinnan Yu, New York, NY (US); Sanjiv Kumar, White Plains, NY (US); Ruiqi Guo, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 825 days.

(21) Appl. No.: 14/951,909

(22) Filed: Nov. 25, 2015

(65) Prior Publication Data

US 2017/0091240 A1    Mar. 30, 2017

Related U.S. Application Data

(60) Provisional application No. 62/232,258, filed on Sep. 24, 2015.

(51) Int. Cl.
| | | |
|---|---|---|
| *G06F 17/00* | (2019.01) | |
| *G06F 16/22* | (2019.01) | |
| *G06F 16/33* | (2019.01) | |
| *G06F 16/951* | (2019.01) | |

(52) U.S. Cl.
CPC ...... *G06F 16/2237* (2019.01); *G06F 16/3331* (2019.01); *G06F 16/951* (2019.01)

(58) Field of Classification Search
CPC .................................................. G06F 16/2237
See application file for complete search history.

(56) References Cited

U.S. PATENT DOCUMENTS

2003/0086593 A1    5/2003  Liu et al.
2005/0065929 A1    3/2005  Rui
(Continued)

FOREIGN PATENT DOCUMENTS

| JP | 2011-188007 | 9/2011 |
| JP | 2012-160047 | 8/2012 |
| JP | 2012-181566 | 9/2012 |

(Continued)

OTHER PUBLICATIONS

JP Notice of Allowance issued in Japanese Application No. 2017-556909, dated Dec. 17, 2018, 7 pages (with Machine translation).
(Continued)

*Primary Examiner* — Ajith Jacob
(74) *Attorney, Agent, or Firm* — Fish & Richardson P.C.

(57) ABSTRACT

Methods, systems, and apparatus, including computer programs encoded on a computer storage medium, for efficiently performing linear projections. In one aspect, a method includes actions for obtaining a plurality of content items from one or more content sources. Additional actions include, extracting a plurality of features from each of the plurality of content items, generating a feature vector for each of the extracted features in order to create a search space, generating a series of element matrices based upon the generated feature vectors, transforming the series of element matrices into a structured matrix such that the transformation preserves one or more relationships associated with each element matrix of the series of element matrices, receiving a search object, searching the enhanced search space based on the received search object, provided one or more links to a content item that are responsive to the search object.

20 Claims, 4 Drawing Sheets

(56) References Cited

U.S. PATENT DOCUMENTS

2008/0263042 A1 10/2008 Li et al.
2009/0290800 A1 11/2009 Lo

FOREIGN PATENT DOCUMENTS

| JP | 2013-246810 | 12/2013 |
|---|---|---|
| JP | 2014-002723 | 1/2014 |
| JP | 2014-146207 | 8/2014 |
| JP | 2015-080181 | 4/2015 |

OTHER PUBLICATIONS

KR Office Action issued in Korean Application No. 10-2017-7031376, dated Nov. 30, 2018, 7 pages (with English translation).
Umezawa et al. "A Study on Identifying Similar Documents based on the Dimension Reduction of a Document Vector,", 3rd Forum on Data Engineering and Information Management, Japan, The Institute of Electronics, Information and Communication Engineer, Engineering Task Force, 2001, 5 pages (with English Abstract).
Gong, Yunchao et al. "Learning Binary Codes for High-Dimensional Data Using Bilinear Projections," IEEE Computer Society Conference on Computer Vision and Pattern Recognition. Proceedings, IEEE Computer Society, US, Jun. 23, 2013, pp. 484-491.
International Search Report and Written Opinion in International Application No. PCT/US2016/047965, dated Nov. 18, 2016, 30 pages.
Anonymous ICCV Submission, "Fast Orthogonal Projection Based on Kronecker Product," ICCV 2015 Submission #844, 9 pages.
International Preliminary Report on Patentability issued in International Application No PCT/US2016/047965, dated Apr. 5, 2018, 9 pages.
Zhang Xu et al. "Fast Orthogonal Projection Based on Kronecker Product," IEEE International Conference on Computer Vision, Dec. 7, 2015, 9 pages.

FAST ORTHOGONAL PROJECTION

CROSS REFERENCE TO RELATED APPLICATION

This application claims the benefit of U.S. App. No. 62/232,258, filed on Sep. 24, 2015, the contents of which are incorporated herein by reference.

BACKGROUND

Large-scale search and retrieval of information in a variety of complex computer processes such as, for example, computer vision applications may utilize linear projections. Such applications may utilize orthogonal projections so as to preserve the Euclidean distance between data points. Generation of such orthogonal projections has typically required the use of an unstructured matrix. However, the computational complexity of building an unstructured orthogonal matrix is $O(d^3)$ while space and time complexity is $O(d^2)$. This means that the generation of an unstructured orthogonal matrix becomes an extremely expensive operation as the input dimensionality d increases.

SUMMARY

According to one implementation of the subject matter described by this specification, linear projections are performed efficiently using a comparatively large structured matrix in order to achieve cost savings with respect to computation time and storage space. The comparatively large, structured matrix may be generated based on a series of comparatively small orthogonal element matrices. For example, the comparatively large structured matrix be formed by taking the Kronecker product of the series of comparatively small orthogonal element matrices. In mathematics, the Kronecker product or tensor product, which is denoted by $\otimes$, is an operation on two matrices of arbitrary size resulting in a large matrix. The Kronecker product is a generalization of the outer product from vectors to matrices, and gives the matrix of the tensor product with respect to a standard choice of basis.

In some aspects, the subject matter embodied in this specification may be embodied in methods that may include the actions of obtaining a plurality of content items. Additional actions may include extracting a plurality of features from each of the plurality of content items, generating a feature vector for each of the extracted features in order to create a search space, generating a series of element matrices based upon the generated feature vectors, wherein each element matrix of the series of element matrices may be associated with one or more relationships, and enhancing the search space at least in part by transforming the series of element matrices into a structured matrix such that the transformation preserves the one or more relationships associated with each element matrix of the series of element matrices. Additional actions may include receiving a search object, searching the enhanced search space based on the received search object, and providing one or more links to one or more content items that are responsive to the search object.

Other versions include corresponding systems, apparatus, and computer programs, configured to perform the actions of the methods, encoded on computer storage devices.

These and other versions may each optionally include one or more of the following features. For instance, in some implementations the relationships associated with the element matrices may include orthogonality. Alternatively, or in addition, the relationships associated with the element matrices may include a Euclidean distance.

In some aspects, transforming the series of element matrices into the structured matrix may include generating a Kronecker projection that is based in part on the application of a Kronecker product to a series of element matrices. The series of element matrices may be randomly generated based, at least in part, on the Euclidean distance of a particular snapshot of a feature vector search space. The transformation of the series of element matrices into a structured matrix such that the transformation preserves the one or more predetermined relationships associated with each element matrix of the series of element matrices may be achieved with a storage complexity of $O(\log d)$ for d-dimensional data.

In certain implementations, the method may include actions for extracting one or more features associated with a search object, generating a search object vector that is representative of the features of the search object, comparing the search object vector against an enhanced search space that includes a structured matrix, and identifying one or more content items that satisfy a predetermined relationship based upon the comparison.

The details of one or implementations are set forth in the accompanying drawings and the description below. Other features and advantages will be apparent from the description and drawings, and from the claims.

BRIEF DESCRIPTION OF THE DRAWINGS

In the drawings, like reference numbers designate like elements throughout.

DETAILED DESCRIPTION

Figure 1:
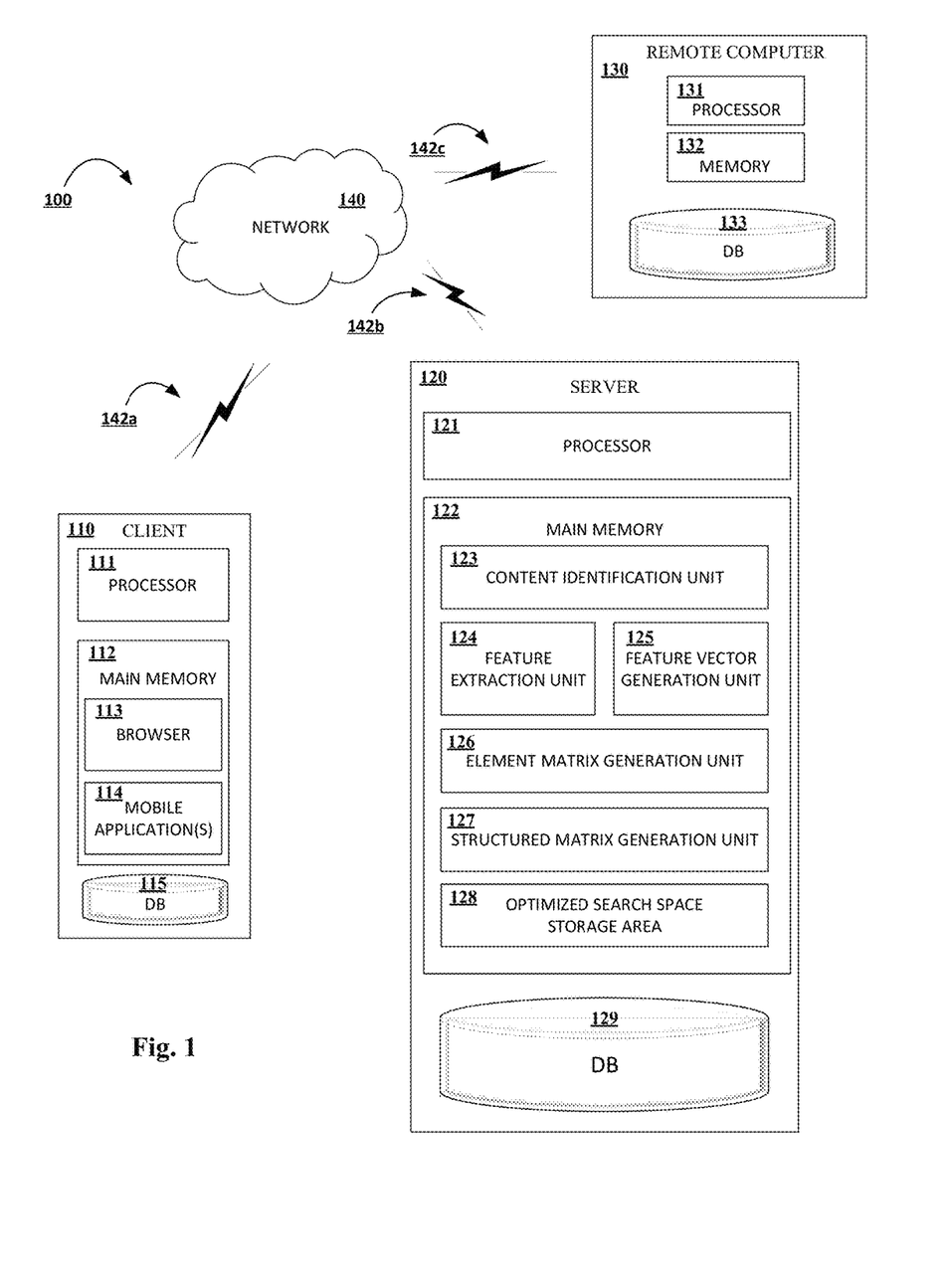
FIG. 1 is a block diagram of an example system that may be utilized to efficiently perform linear projections, in accordance with at least one aspect of the present disclosure.

FIG. 1 is a block diagram of an example system 100 that may be utilized to efficiently perform linear projections, in accordance with at least one aspect of the present disclosure. System 100 may include, for example, a client 110, a server 120, a remote computer 130, and a network 140.

In general, using the example system 100, a family of structured matrices may be used to efficiently perform orthogonal projections for high-dimensional data that may exist in relation to a variety of complex computer applications such as, for example, computer vision applications. The system 100 may provide for the creation of a series of comparatively small orthogonal element matrices. Once the series of comparatively small orthogonal element matrices are obtained, aspects of the present disclosure may transform the series of small orthogonal element matrices into a structured matrix. In accordance with at least one aspect of the present disclosure, the structured matrix may be formed by taking the Kronecker product of the series of small orthogonal element matrices. As a result of such a transformation, the present disclosure may achieve advantages over existing systems in both computational complexity and space complexity. For instance, the present disclosure achieves a computational complexity of O(d log d) and a space complexity of O(log d) for d-dimensional data.

The reduction of memory and processing capability required to store, search, and retrieve high dimensional data maintained in large databases achieved by the method, system, and non-transitory computer readable medium of the present disclosure are significant. Such advantages provided by the present disclosure may enable the search and retrieval of high dimensional data to be performed on mobile platforms, which may lack the requisite memory space to facilitate efficient storage, search, and retrieval of high dimensional data. Accordingly, complex computer applications including, but not limited to, image search, video search, display of relevant content ads, and/or map data may be implemented with a smaller memory footprint and less processing power, thus enabling storage, search, and retrieval of high dimensional data associated with such applications via mobile platforms such as, for example, a smartphone, tablet, and/or other thin client devices.

The client 110 of system 100 may include at least a processor 111, a memory 112, and a database 115. The memory 112 may provide for the storage of computer program code used to execute one or more applications on client 110. The applications may include, for example, a browser 113. The client 110 may be able to access one or more web based applications via the network 140 using browser 113. Such web based applications may include, for example, a maps application, a video streaming application, a mobile payment system, advertising services, or the like. Browser 113 may be configured receive inputs from a user of client 110 through one or more user interfaces associated with client 110. Received inputs may include, among other things, for example, search queries input via a keypad, e.g., physical keyboard, graphically reproduced keyboard via a capacitive touch user interface, or the like, search queries input via a voice command, gestures representative of one or more executable commands, or the like.

Alternatively, or in addition, the client 110 may utilize processor 111 and memory 112 to store and execute one or more mobile applications 114 stored locally on client 110. For instance, client 110 may include a content database 115 that may be configured to store local content including, for example, text files, audio files, image files, video files, or combinations thereof. To retrieve such stored local content from content database 115, one or more mobile applications 114 may provide functionality to facilitate, for example, a local document search, a local audio file search, a local image file search, a local video search, or the like. Alternatively, or in addition, however, a mobile application 114 may also ensure that any such local search may also be executed remotely against one or more content databases 129, 133 hosted by one or more computers 120, 130 accessible via network 140 to provide a merged list of search results that may include search results from both local and remote content databases. Similarly, mobile applications 114 may include other types of applications that include, for example, handwriting recognition programs. Other types of mobile applications 114 may also fall with the scope the disclosure provided by this specification.

Mobile applications 114 may be configured to receive inputs from a user of client 110 in a manner similar to that described above with respect to browser 113. Alternatively, or in addition, one or more mobile applications 114 may be configured to receive different inputs than browser 113 based on the particular functionality provided by the one or more mobile application 114. For instance, a handwriting recognition program may be configured to receive inputs in the form of handwritten text input via motions performed by a user using a stylus or the user's finger in combination with a capacitive touch user interface that is either integrated to the client 110 or externally coupled to client 110. Once such input is captured by aspects of the present disclosure, features associated with the handwritten text input may be searched to retrieve one or more text characters, text strings, or the like that may correspond to the handwritten input, in accordance with aspects of the present disclosure.

Client 110 may be representative of one or multiple client devices. Such client devices may include, for example, mobile computing platforms and non-mobile computing platforms. Mobile computing platforms may include, for example, a smartphone, tablet, laptop computers, or other thin client devices. Non-mobile computing platforms may include, for example, desktop computers, set top box entertainment systems, or the like. Clients 110 may be configured to communicate server 120 via network 140 using one or more communications protocols.

Server 120 may be representative of one or more multiple server computers. Server 120 may include at least a processor 121, memory 122, and content database 129. The memory 122 may include a suite of software tools that may be utilized to implement features of the subject matter disclosed by this specification. These software tools may include, for example, a content identification unit 123, a feature extraction unit 124, a feature vector generation unit 125, an element matrix generation unit 126, and a structured matrix generation unit 127. The aforementioned software tools may each comprise program instructions that, when executed by processor 121, may perform the exemplary functionality described in this specification to create an enhanced search space that significantly reduces the memory footprint required to facilitate storage, search, and retrieval operations involving high dimensional data. High-dimensional data may include data with many dimensions such as, for example, hundreds of dimensions, thousands of dimensions, millions of dimensions, or even more dimensions.

Content identification unit 123 may be configured to obtain content from one or more of a plurality of different sources. For instance, content identification unit 123 may utilize a web crawler, web spider, or the like that may traverse network 140 to scan and identify content items maintained in database 133 of one or more remote computers 130. Once identified, content identification unit may obtain a copy of the content item, or a portion thereof, from database 133 and store the copy of the content item in content database 129 of server 120. The content item may include a variety of different types of content that may be created using a client 110, server 120, or remote computer 130 including, for example, text data, audio data, image data, video data, or any combination thereof.

Alternatively, or in addition, content identification unit 123 may be configured to capture portions of content input by a user via one or more user interfaces of client device 110. For instance, content identification unit 123 may be configured to capture handwritten text input via motions performed by a user using a stylus or the user's finger in combination with a capacitive touch user interface that is either integrated into client 110 or externally coupled to client 110. Alternatively, or in addition, content identification unit 123 may be configured to receive one or more content items that may be uploaded via one or more remote computers. For instance, content identification unit 123 may receive one or more content items that one or more users of remote computer 130 wishes to add to a library of content items maintained by database 129. Alternatively, or in addition, content identification unit may be configured to obtain content items that were previously stored in database 129 of server 120.

Content items obtained from one or more of the aforementioned sources may be used to generate a library of content items stored in database 129 that may be made available for access by one or more users of client 110, remote computer 130, or the like. For instance, server 120 may aggregate a vast amount of location information, geographic information, image information, and the like over a certain period of time that may be used to support a maps application accessible to a user of client 110 via either browser 112 or a mobile application 114 or to a user of similar applications via remote computer 130. Alternatively, or in addition, for example, server 120 may aggregate a vast amount of video files over a certain period of time in order to support a video streaming service accessible to a user of client 110 via either browser 112 or a mobile application 114 or to a user of similar applications via remote computer 130. The content items obtained by server 120 may be similarly utilized to support other types of applications accessible to users of client 110 or a remote computer 130.

Content identification unit 123 may periodically determine that a sufficient number of content items have been collected in order to begin generation of an enhanced search space. This periodic determination may be based upon, for example, the expiration of a predetermined period of time. Alternatively, or in addition, the periodic determination may be made based upon the collection of a predetermined amount of data, e.g., after collecting 100 GB of data, 100 TB of data, or the like. Alternatively, or in addition, the periodic determination may be made based upon the determination that content has been collected from a predetermined amount of content sources, e.g., content captured from a predetermined number of users subscribed to a service, content captured from a predetermined number of users actively using the service, content captured from a predetermined percentage of all known content sources, or the like. Alternatively, or in addition, the content identification unit 123 may trigger the generation of an enhanced search space in response to the receipt of an instruction to generate an enhanced search space from one or more human users.

Feature extraction unit 124 may be configured to analyze the content obtained by content identification unit 123 in order to identify particular content dependent features, or characteristics, that may be uniquely associated with each particular content item. Feature data may include, for example, colors, counters, curves, texture, pixels or the like that may be associated with, for example, image content. Alternatively, or in addition, feature data may include, for example, document keywords, word use frequency, or the like associated with, for example, text content. As the complexity of the content resources increases, the number of features associated with the content may similarly increase. For instance, a particular high definition image may be associated with at least one feature that corresponds to each particular pixel in the image. The likelihood that a particular content item can be identified during a search and retrieval process based on features extracted from the content item may increase with the amount of features that are extracted from the content item. The content features extracted by feature extraction unit 124 may be stored in memory unit 122 or database 129 for subsequent use by feature vector generation unit 125.

Feature vector generation unit 125 may be configured to obtain, or otherwise receive, high-dimensional feature data extracted by feature extraction unit 124. Upon receipt of the extracted feature data, feature vector generation unit 125 may generate a plurality of feature vectors that may be used to numerically represent each of the features extracted from the obtained content. The values of a particular feature vector may be expressed in the form of a single row matrix. The collective set of feature vectors generated from the extracted features stored in database 129 may thus create a searchable model of the high-dimensional data obtained by content identification unit 123. Similarity determinations may be made between any two or more feature vectors based on the calculation of a Euclidean distance between the two or more feature vectors. The smaller the Euclidean distance, the greater the similarity that may exist between the feature vectors.

In at least one aspect of the subject matter disclosed by the present specification, there may exist a Euclidean distance between each feature vector that exists in a particular feature vector search space for a particular snapshot of the feature vector search space at any particular point in time. A particular snapshot of a feature vector search space may be captured, for example, at any particular point in time after a predetermined number of feature vectors have been generated by feature vector generation unit 125. In certain instances, prior to learning or optimizing a feature vector search space, there may exist an original feature vector search space that includes multiple feature vectors that are each separated by an original Euclidean distance. Alternatively, or in addition, the original Euclidean distance may be, for example, the Euclidean distance that exists between each of the feature vectors at the time a snapshot of the feature vector search space is captured.

Element matrix generation unit 126 may be configured to obtain, or otherwise receive, a plurality of high dimensional feature vectors generated by feature vector generation unit 125. Element matrix generation unit 126 may then organize the obtained feature vectors into a series of M element matrices. Each element matrix in the series of M element matrices may be comparatively smaller than the structured matrix that is described below. For example, in at least one aspect of the subject matter disclosed by the present specification, each element matrix may be of the size 2×2. Alternatively, or in addition, each element matrix in the series of M element matrices may be orthogonal. Element matrix generation unit 126 may generate the series of M element matrices by, for example, generating a small, random Gaussian matrix and then performing QR factorization. The random generation of the series of M element matrices may be, for example, based at least in part upon the original Euclidean distance of a particular snapshot of a feature vector search space. For example, each element matrix in the series of M element matrices may be randomly generated in order to preserve the original Euclidean distance of the original feature vector search space. Alternatively, the series of M element matrices may be configured to utilize a machine learning system to train the element matrices in order to return, for example, particular image results when presented with a particular image.

Structured matrix generation unit 127 may be configured to obtain, or otherwise receive, a series of M element matrices generated by element matrix generation unit 126. The structured matrix generation unit 127 may be configured to transform the series of M element matrices into a structured matrix. The structured matrix may be comparatively larger in size than each matrix of the series of M comparatively smaller, element matrices. The transformation of the series of M element matrices may occur in a manner that preserves the relationships associated with each element matrix of the series of M element matrices. The preserved relationship may include, for example, orthogonality or Euclidean distance. In at least one aspect of the present disclosure, the transformation may include generating a linear projection by taking the Kronecker Product of a series of M element matrices. With respect to at least one aspect of the subject matter disclosed by the present specification, the Kronecker Product of the series of M element matrices may be achieved using processes that include, for example, fast fourier transforms or fast fourier transform-like calculations. The generation of a linear projection using structured matrix generation unit 127 to transform of the series of M small element matrices into a comparatively larger structured matrix may result in a significant reduction in computation and space costs compared to the projection of unstructured matrices. For instance, linear projections generated using structured matrix generation unit 127 may achieve computation speeds of $O(d \log d)$ and space complexity of $O(\log d)$ for d dimensional data as opposed to computation speeds of $O(d^2)$ and space complexity of $O(d^2)$ for unstructured matrices.

The output of structured matrix generation unit 127 may result in an enhanced search space. The enhanced search space may be stored in enhanced search space storage area 128. Though the search space has been enhanced to reduce space complexity to $O(\log d)$ from $O(d^2)$ for unstructured matrices, the comparatively larger structure matrix may still provide a representation of the feature vector space that may include substantially all of the generated feature vectors for a particular set of content items. Accordingly, neither accuracy nor precision of a search is compromised utilizing aspects of the present disclosure, described herein.

Remote computer 130 may be representative of one or more multiple remote computers. Each remote computer 130 may include at least a processor 131, a memory 132, and content database 133. Remote computer 130 may be configured to make one or more content items available for discovery to software tools capable of identifying and obtaining web content such as, for example, content identification unit 123. One or more users of certain remote computers 130 may also be able to search and access content items maintained in content database 129. Remote computer 130 may be configured to communicate with server 120 via network 140.

Network 140 may be configured to facilitate connectivity between a client 110, a server 120, and/or a remote computer 130. Client 110, server 120, and/or remote computer 130 may be connected to network 140 via one or more wired, or wireless, communication links 142a, 142b, and/or 142c, respectively. Network 140 may include any combination of one or more types of public and/or private networks including but not limited to a local area network (LAN), wide area network (WAN), the Internet, a cellular data network, or any combination thereof.

Figure 2:
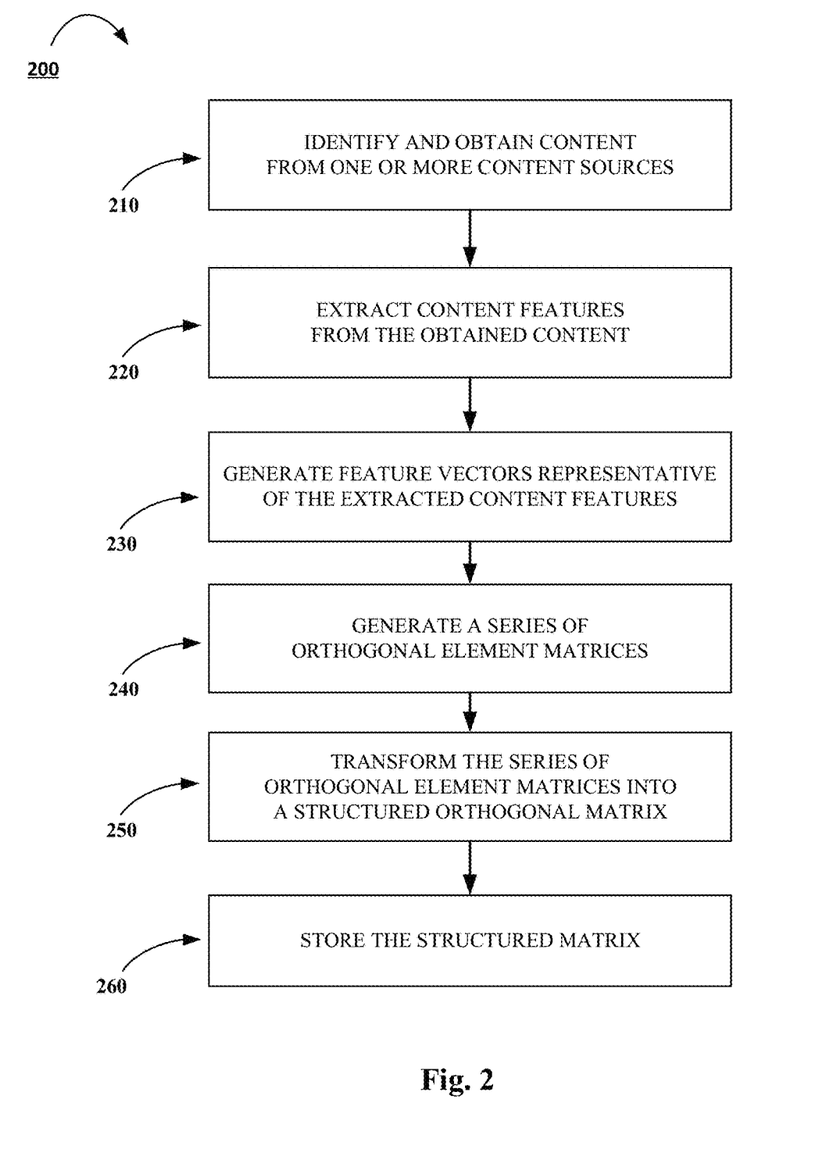
FIG. 2 is a flowchart of an example process that may be utilized to efficiently perform linear projections, in accordance with at least one aspect of the present disclosure.

FIG. 2 is a flowchart of an example process 200 that may be utilized to efficiently perform linear projections, in accordance with at least one aspect of the present disclosure.

Process 200 may begin at 210 by utilizing content identification unit 123 to initiate a scan for content via one or more content items from one or more content sources that may be local, or remote, from server 120. The content scan may be performed by, for example, a web crawler, web spider, or the like. Alternatively, or in addition, content identification unit 123 may receive one or more content items from one or more remote computers 130 or one or more client computers 110. Once the content is identified, content identification unit may sample the identified content and store at least a portion of the identified content in content database 129, store at least a portion of the identified content in another portion of main memory 122, or transmit at least a portion of the identified content to feature extraction unit 124.

Process 200 may continue at 220 where a feature extraction unit 124 may access one or more portions of content identified by content identification unit 123. Feature extraction unit 124 may extract one or features and/or characteristics associated with the obtained content. The extracted features may be stored in content database 129, stored in another portion of main memory 122, or transmitted to feature vector generation unit 125.

Process 200 may continue at 230 where a feature vector generation unit 125 may generate one or more feature vectors based on the content features extracted by feature extraction unit 124. The feature vectors may be used to generate a searchable data model of high-dimensional data. The searchable model may be facilitate similarity determinations based on a comparison of two or feature vectors. Such comparisons may be based on the evaluation of a Euclidean distance that exists between two or more feature vectors. The smaller the distance that exists between any given pair of feature vectors, the greater the similarity that may exist between the feature vectors. Generated feature vectors may be stored in content database 129, stored in another portion of main memory 122, or transmitted to element matrix generation unit 126.

Process 200 may continue at 240 where an element matrix generation unit 126 may generate a series of M element matrices based on a set of a plurality of high dimensional feature vectors generated by feature vector generation unit 125. Each matrix of the series of M element matrices may be orthogonal. The series of M element matrices may be randomly or pseudo-randomly generated based at least in part upon the original Euclidean distance of a particular snapshot of a feature vector search space. Alternatively, or in addition, the series of M element matrices may be trained using one or more machine language learning system, such as those set forth herein below. The generated series of M element matrices may be stored in content database 129, stored in another portion of main memory 122, or transmitted to structured matrix generation unit 117.

Process 200 may continue at 250 where a structured matrix generation unit 127 may be configured to create a comparatively larger, structured matrix based on a series of M comparatively smaller element matrices. The comparatively larger, structured matrix may be created by transforming or rotating the series of M element matrices into the comparatively larger structured matrix. The transformation may be performed such that the transformation preserves the relationships associated with each element matrix of the series of M element matrices. In at least one aspect of the subject matter disclosed by the present specification, the transformation may include generating a linear projection by taking the Kronecker Product of the series of M element matrices. The comparatively larger, structured matrix may result in an enhanced search space. The space complexity of the comparatively larger, structured matrix may be on the order of $O(\log d)$ for d-dimensional data. At 260, the enhanced search space may be stored in main memory in an enhanced search space storage area 128, stored in content database 129, or the like.

While the present disclosure is described herein with respect to the Kronecker product, it is noted that the present disclosure need not be so limited. As such, other methods of matrix transformation or rotation may be utilized to facilitate the transformation of a series of small orthogonal element matrices into a large structured matrix, as described herein. For example, any efficient transformation of element matrices that preserves one or more relationships associated with the series of element matrices may be utilized in order to generate the large structured matrix from the series of small orthogonal element matrices in accordance with the present disclosure. Examples of such relationships that may be preserved in the generated structured matrix include, among other things, for example, orthogonality, Euclidean distance, etc.

Figure 3:
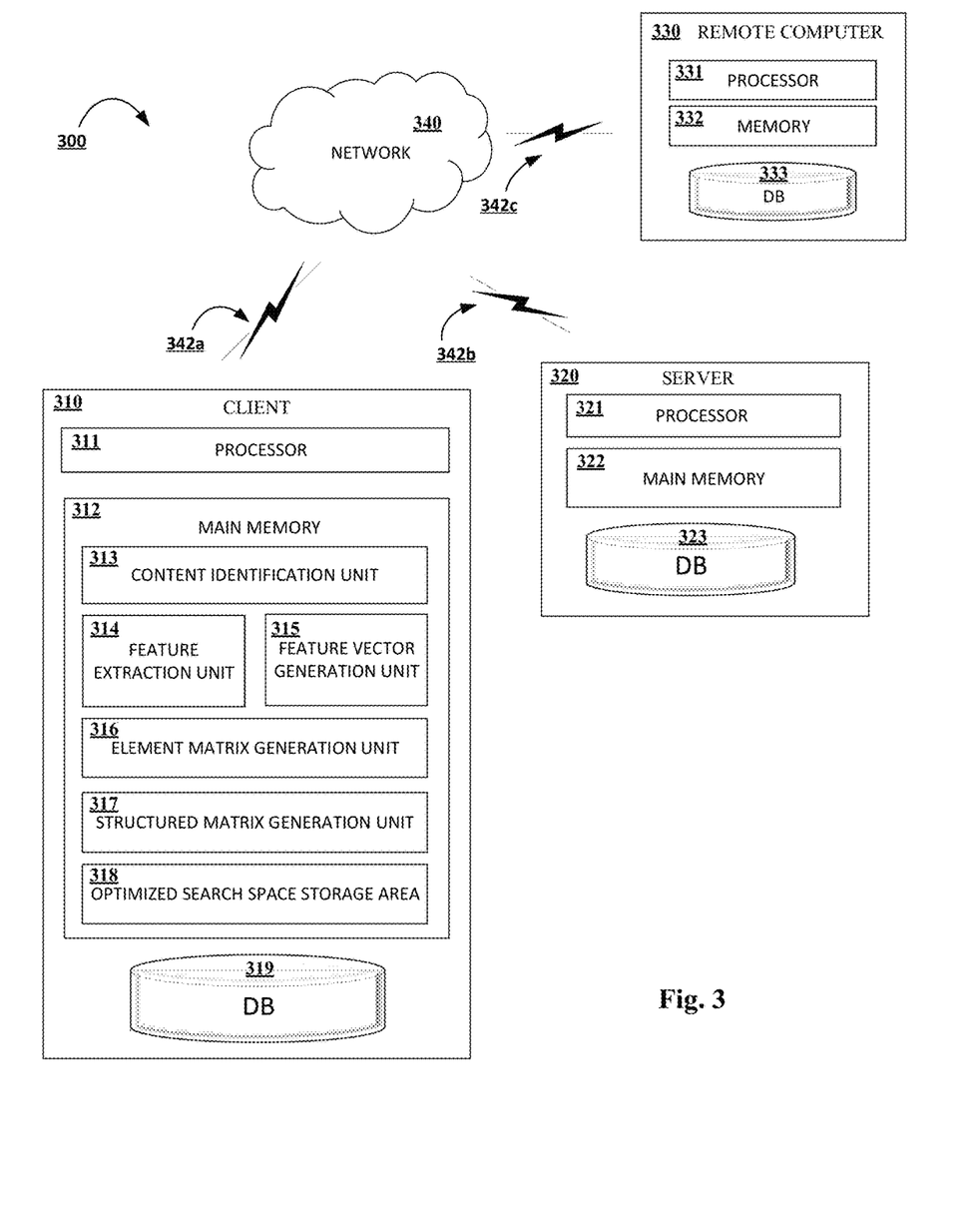
FIG. 3 is a block diagram of another example system that may be utilized to efficiently perform linear projections, in accordance with at least another aspect of the present disclosure.

FIG. 3 is a block diagram of an example system 300 that may be utilized to efficiently perform linear projections, in accordance with at least another aspect of the present disclosure. System 300 may include, for example, a client 310, a server 320, a remote computer 330, and a network 340.

Client 310 may include one or multiple client devices that each may be substantially similar to client 110. Client 310 may include at least a processor 311, a main memory 312, and a content database 319. However, client 310 may also include a content identification unit 313, a feature extraction unit 314, a feature vector generation unit 315, an element matrix generation unit 316, a structured matrix generation unit 317, and an enhanced search space storage area 318. Each of content identification unit 313, a feature extraction unit 314, a feature vector generation unit 315, an element matrix generation unit 316, a structured matrix generation unit 317, and an enhanced search space storage area 318 may be substantially the same as the content identification unit 123, feature extraction unit 124, feature vector generation unit 125, element matrix generation unit 126, structured matrix generation unit 127, and enhanced search space storage area 128 of FIG. 1, system 100. However, in system 300 of FIG. 3, content identification unit 313, feature extraction unit 314, feature vector generation unit 315, element matrix generation unit 316, structured matrix generation unit 317, and enhanced search space storage area 318 may be implemented on client 310 instead of, or in addition to, server 320. As a result, efficiencies provided by the subject matter of the present specification may facilitate the search and retrieval of high dimensional data on client devices such as, for example, client 310.

Accordingly, the features of the subject matter described by the present specification may be applied to aspects of one or more mobile applications 114 that may be run on client 310 such as, for example, the generation of an enhanced search space to support local storage, search, and retrieval of text files, audio files, image files video files, or combinations thereof. Features of the present disclosure may also be applicable to the generation of an enhanced search space to improve storage, search, and retrieval operations associated with other types of mobile applications such as, for example, handwriting recognition applications, search and display of content advertisements, or the like.

As a result of the features described above, the present disclosure may provide significant advantages to search and retrieval techniques including, for example, the approximate nearest neighbor (ANN) search method when utilizing approaches such as, among other things, for example, binary embedding or Cartesian k-means. The present disclosure thus solves complex search problems with better accuracy while also requiring significantly less time and memory.

Figure 4:
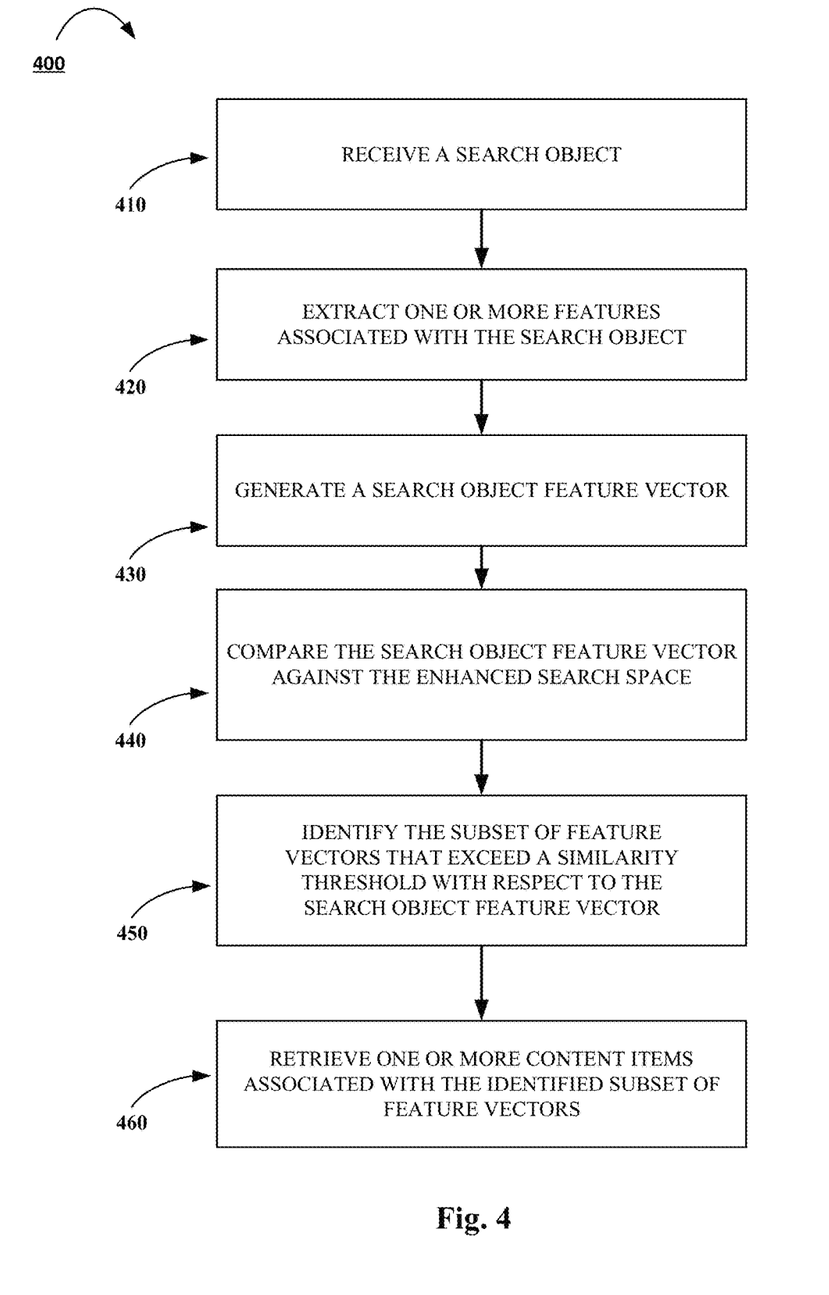
FIG. 4 is a flowchart of an example process for executing a search query against an enhanced search space, in accordance with at least on aspect of the present disclosure.

FIG. 4 is a flowchart of an example process 400 for executing a search query against an enhanced search space, in accordance with at least on aspect of the present disclosure.

Process 400 may begin at 410 when a computer such as, for example, server 120 or client 310, receives a search object. The search object may include a query that includes one or more keywords, an image, a video clip, handwriting strokes input via a stylus or a user's finger, an address, and/or other data that may be associated with a content item maintained by a content database 129 or 319. After receiving the search object, server 120 or client 310 may analyze the search object to extract one or multiple features, or characteristics, associated with the received search object at 420.

Process 400 may continue at 430 by generating one or multiple search object feature vectors associated with the search object and based upon the search object features extracted at 420. At 440, the server 120 or client 310 may process the search object feature vectors against a previously generated enhanced search space maintained in enhanced search space storage area 128 or 318. This may include, for example, analyzing the search object feature vectors in view of the linear projection of the structured matrix in order to identify a subset of high-dimensional feature vectors that provide a nearest neighbor match for the search object feature vector. Alternatively, or in addition, stage 440 may include identifying multiple matches that represent the subset of feature vectors that fall within a predetermined threshold distance of the search object feature vector. In at least one aspect of the present disclosure, the distance between the search object vector and the feature vectors linearly projected via a structured matrix in the enhanced search space may be a Euclidean distance. Finally, at 460 the process may retrieve one or more content items associated with the subset of feature vectors identified in the enhanced search space as sufficiently matching the search object feature vector. Alternatively, or in addition, one or more links referencing the retrieved content items may be provided to the computer that submitted the search object.

As described above, at least in part, at least one stage in a method for large-scale search and retrieval of data associated with complex computer applications may be to utilize a linear projection. For a given a vector such as, for example, $x \in \mathbb{R}^d$, and a projection matrix $R \in \mathbb{R}^{k \times d}$, the linear projection may be as shown below in Equation (1) $h(x) \in \mathbb{R}^k$:

$$h(x) = Rx. \qquad (1)$$

Such linear projections may be followed by, among other things, for example, quantization to convert high dimensional features into compact codes that utilize less memory such as, for example, binary embeddings or product code. The compact codes may be binary code or non-binary code. Such compact codes may be used to efficiently perform search execution time and reduce storage requirements associated with a variety of complex computer applications such as, for example, image retrieval, feature matching, attribute recognition, and object categorization, etc. For example, a Locality Sensitive Hashing (LSH) technique for large-scale approximate nearest neighbor search may be utilized to linearly project input data before converting the input data into a compact code. For instance, a k-bit binary code may satisfy Equation (2) below:

$$h(x) = \text{sign}(Rx). \qquad (2)$$

However, such linear projection operations become computationally expensive as the input dimensionality d increases. To achieve high recall in retrieval tasks, one may use long codes with a large k such that k=O(d). In this case, the space and computational complexity of projection is $O(d^2)$, and such a high projection cost often becomes the bottleneck at both learning and prediction time. For example, when k=d=50,000, a projection matrix alone may require 10 GB (single precision) and projecting one vector can take 800 ms on a single core.

In at least one aspect of the present disclosure, the projection matrix may be orthogonal. Orthogonal transformation may be beneficial because, among other things, for example, it may preserve the Euclidean distance between points, and is also known to distribute the variance more evenly across the dimensions. These properties are important to make several well-known techniques perform well on real world data.

Utilizing orthogonal projections may provide additional benefits to particular applications. For instance, orthogonality may be one approach to satisfying the goal of learning maximally uncorrelated bits while learning data-dependent binary codes. One way to achieve this aforementioned goal is by imposing orthogonal, or near orthogonal, constraints on the projections. Similarly, in binary embedding, imposing an orthogonality constraint on a projection may achieve improved results when executing an approximate nearest neighbor search.

In order to efficiently perform linear projections for high-dimensional data, the present disclosure provides a method, system, and non-transitory computer readable medium for transforming a series of small element matrices into a structured matrix in a manner that preserves the relationships associated with the original element matrices as the relationships existed prior to transformation of the matrices. The structured matrix that results from the transformation may be, for example, a large single matrix. Alternatively, however, the structured matrix may be conceptually representative of a flexible family of orthogonal structured matrices. In least one aspect of the present disclosure, the preserved relationship may be the orthogonality associated with each matrix of the series of element matrices. Alternatively, or in addition, the preserved relationship may be the distance between corresponding feature vectors associated with a matrix. The distance may be, for example, the Euclidean distance between corresponding feature vectors associated with a matrix. The transformation of the element matrices may be achieved by using a Kronecker product of the small element matrices, leading to substantially reduced space and computational complexity. The flexibility associated with this transformation may facilitate a variation of the number of free parameters in the matrices to adapt to the needs of a given application.

Accordingly, at least one aspect of the present disclosure may construct a family of orthogonal structured matrices by transforming a series of small orthogonal matrices to form a large structured matrix. At least one aspect of the present disclosure facilitates the aforementioned transformation by using the Kronecker product of a series of small orthogonal element matrices. The Kronecker projection matrix may satisfy Equation (3):

$$R = A_1 \otimes A_2 \otimes \ldots \otimes A_M, \quad (3)$$

In Equation (3), $A_j$, j=1, ..., M are small orthogonal matrices. The small orthogonal matrices $A_j$, j=1, ..., M may be referred to as element matrices. A large matrix produced in accordance with the aforementioned transformation may be associated with at least four main advantages. First, the large matrix satisfies the orthogonality constraint and therefore the large matrix may preserve Euclidean distances in the original space. Second, Fast Fourier Transform-like computations can be used to compute the projection with a time complexity of O(d log d). Third, by changing the size of the element matrices, the resulting large matrix may be associated with a varying number of parameters (degrees of freedom), thus making it easier to control performance-speed trade-off. Fourth, the space complexity of the large matrix is O(log d) in comparison to O(d) for most other structured matrices. In addition, the proposed Kronecker projection provides advantages in the approximate nearest neighbor search problem under a variety of different settings that include, for example, binary embedding and vector quantization.

Binary embedding methods may map original vectors into k-bit binary vectors such that $h(x) \in \{+1, -1\}^k$. Such a mapping may utilize a representation of datapoints as binary codes, thereby significantly reducing the storage cost even when k=O(d). The approximate nearest neighbors may be retrieved using Hamming distance in the binary code space, which can be computed very efficiently in a variety of ways including, for example, using a table lookup, or the POP-CNT instruction on modern computer architectures.

LSH may be used to generate binary codes in a manner that preserves cosine distance and typically uses randomized projections to generate binary code. However, using such randomized projections may forego the advantages of learning data-dependent binary codes by optimizing the projection matrix R. For instance, methods utilizing Iterative Quantization (ITQ) indicate that by using a PCA projection followed by a learned orthogonal projection, the resulting binary embedding may outperform a nonorthogonal or randomized orthogonal projection. The projection may be learned by alternating between projecting datapoints and solving for projections via SVD. However, for high dimensional features, such an approach may be infeasible unless the dimensionality is radically reduced, which hurts performance. Utilizing aspects of the present disclosure that facilitate projections learned with the Kronecker product results in similar performance capabilities as ITQ, while being substantially more efficient.

Quantization methods may represent datapoints via a set of quantizers, which may typically be obtained by vector quantization algorithms such as, for example, the k-means algorithm. To search for the nearest neighbors of a given query vector q, the Euclidean distances between q and all datapoints in the database may be computed. The Euclidean distances may be approximated by vector-to-quantizer distances. Alternatively, or in addition, when the data is high dimensional, quantization may be carried out in subspaces independently. A commonly used subspace may be identified by chunking the vectors, which may lead to the Product Quantization (PQ).

The distance between the query vector q and a database point x may be set forth with respect to Equation (4):

$$\|q - x\| \approx \sqrt{\sum_{i=1}^{m} \|q^{(i)} - \mu_i(x^{(i)})\|^2}, \quad (4)$$

In Equation (4), where m is the total number of subspaces, $x^{(i)}$ and $q^{(i)}$ are subvectors and $\mu_i(x^{(i)})$ is the quantization function on subspace i. Because of its asymmetric nature, only the database points are quantized, and not the query vector. To increase performance, different subspaces have similar variance for the given data. One way to achieve this is by applying an orthogonal transform R to the data, as set forth in Equation (5):

$$\|q - x\| = \|Rq - Rx\| \approx \sqrt{\sum_{i=1}^{m} \|(Rq)^{(i)} - \mu_i(Rx)^{(i)}\|^2}. \quad (5)$$

Since the projection matrix R is orthogonal, the projection matrix R may preserve the Euclidean distance. Instead of using a random projection matrix, the projection matrix can be learned from given data leading to improved retrieval results. However, methods for facilitating the projection operation in existence prior to the present disclosure can be associated with high resource costs, e.g., processor use, memory use, execution time, etc., in high-dimensional spaces.

Accordingly, for at least the reasons described above, for both binary embedding and quantization, a fast projection that is both orthogonal and efficiently learnable is needed. As discussed below, these objectives may be achieved by transforming a series of element matrices into a large structured matrix using a transformation algorithm that preserves the relationships associated with each respective element matrix. The transformation algorithm may include, among other things, for example, the use of a Kronecker product to generate the projection.

The Kronecker product may be associated with a number of properties that facilitate the aforementioned transformation. For instance, Let $A_1 \in \mathbb{R}^{k_1 \times d_1}$, and $A_2 \in \mathbb{R}^{k_2 \times d_2}$. The Kronecker product of $A_1$ and $A_2$ is $A_1 \otimes A_2 \in \mathbb{R}^{k_1 k_2 \times d_1 d_2}$ satisfies Equation (6):

$$A_1 \otimes A_2 = \begin{bmatrix} a_1(1,1)A_2 & \cdots & a_1(1,d_1)A_2 \\ a_1(2,1)A_2 & \cdots & a_1(2,d_1)A_2 \\ \vdots & \ddots & \vdots \\ a_1(k_1,1)A_2 & \cdots & a_1(k_1,d_1)A_2 \end{bmatrix}, \quad (6)$$

In Equation (6), where $a_1(i,j)$ is the element of the i-th row, and j-th column of $A_1$. The Kronecker product may also be referred to as a tensor product or a direct product. The operation mat(x,a,b) may reshape a d dimensional vector to an a×b matrix (ab=d), and vec(·) may form a vector by "stretching" the matrix into a vector, and vec(mat(x,a,b))=x.

The Kronecker product may be associated with a plurality of characteristics that facilitate the advantages recited herein. For instance, at least a subset of these characteristics aid in the generation of a fast orthogonal projection, while also preserving the relationships associated with the original element matrices. Two particular characteristics of the Kronecker product that facilitate the aforementioned advantages include $(A_1 \otimes A_2)x = \text{vec}(A_2 \text{mat}(x, d_2, d_1)A_1^T)$, and the fact that the Kronecker product preserves the orthogonality of the element matrices. That is, if $A_1$ and $A_2$ are both orthogonal, $A_1 \otimes A_2$ is also orthogonal.

According to at least one aspect of the present disclosure, a Kronecker projection matrix $R \in \mathbb{R}^{k \times d}$ may include a Kronecker product of several element matrices, as set forth below in Equation (7):

$$R = A_1 \otimes \ldots \otimes A_j \otimes \ldots \otimes A_M = \otimes_{j=1}^{M} A_j \quad (7)$$

Where, in Equation (7), $A_j \in \mathbb{R}^{k_j \times d_j}$ with $\Pi_{j=1}^{M} k_j = k$ and $\Pi_{j=1}^{M} d_j = d$.

One benefit of forming a large matrix in this way is that is that computation of the Kronecker projection can take advantage of the reduced computational complexity. In order to simplify the discussion, we assume that matrix R is square i.e., k=d, and all the element matrices are also square with the same order $d_e$. Floating points operations (FLOPs) give an accurate estimate of computational cost of different methods. Let the FLOPs to compute the Kronecker projection on a d-dimensional vector, with element matrices of the order $d_e$, be $f(d, d_e)$. One property of Kronecker product is shown below in Equation (8).

$$R_x = (\otimes_{j=1}^{M} A_j)x = \text{vec}((\otimes_{j=2}^{M} A_j)\text{mat}(x, d/d_e, d_e)A_1^T). \quad (8)$$

Performing mat(x, $d/d_e$, $d_e$) $A_1^T$ needs $d(2d_e - 1)$ FLOPs ($dd_e$ multiplications and $dd_e - d$ additions). After that computing $(\otimes_{j=2}^{M} A_j)\text{mat}(x, d/d_e, d_e)A_1^T$ turns out to be $d_e$ smaller scale problems, each computing a Kronecker projection with feature dimension $d/d_e$, and element matrix of order $d_e$, as reflected in Equation (9).

$$f(d,d_e) = d(2d_e - 1) + d_e f(d/d_e, d_e). \quad (9)$$

Based on Equation (9), the FLOPs of performing Kronecker projection of a d-dimension vector is $d(2d_e - 1)\log_{d_e} d$.

Another appealing characteristic of a Kronecker projection that assists in facilitating the advantages described herein is the flexibility of its structure. For instance, by controlling the size of $A_j$, j=1, ..., M, one may easily balance the number of parameters (therefore the capacity) of the model and the computation cost. There are $\log_{d_e} d$ element matrices, each with $d_e^2$ parameters. The number of parameters in a Kronecker projection may be $d_e^2 \log_{d_e} d$, which ranges from $d^2$ (when $d_e = d$) to $4 \log_2 d$ (when $d_e = 2$).

Above, the present disclosure has been described with reference to examples wherein the Kronecker projection R, and all the element matrices are square. However, the present disclosure need not be so limited. Instead, for example, the present disclosure may also extended to the non-square Kronecker projections and/or non-square element matrices. For instance, the sizes of the element matrices may be chosen by factorizing d and k. Alternatively, or in addition, there may arise instances when d or k cannot be factorized as the product of small numbers. For example, with respect to the input feature, one may alter the dimension by subsampling or padding zeros. Separately, for example, with respect to the output, one may use a longer code and then subsample. The generation of a Kronecker projection will be further discussed below in the context of both a square projection matrix R and a non-square projection matrix.

In a manner similar to an unstructured projection, circulant projection, and/or bilinear projection, etc., a Kronecker projection may also be generated randomly. However, a randomly generated Kronecker projection improves upon the aforementioned listing of projections because it is suitable for high-dimensional data.

The randomized Kronecker projection may be applied in binary embedding and quantization. Such applications of the Kronecker projection may be achieved by replacing the unstructured projection matrix (R in Equation (1) and Equation (5)) with the randomized Kronecker projection matrix.

For instance, with respect to the Kronecker projection, the method, system, and computer program described herein may generate M (small) orthogonal element matrices. In at least one aspect of the present disclosure, the element matrices may be generated by creating a small random Gaussian matrix and then performing QR factorization. For element matrices of size 2×2, for example, the time complexity of generating a randomized Kronecker projection of order d is only O(log d). This is a significant benefit because, for example, the generation of an unstructured projection of an orthogonal matrix of order d which has a time complexity O(d³). Accordingly, the randomized Kronecker projection provides a practical solution for generating randomized projections for high-dimensional data.

In accordance with another aspect of the present disclosure, a system and method to optimize Kronecker projection parameters is disclosed. As explained in more detail below, the optimization algorithm will be discussed with respect to binary embedding, quantization, and then it will be shown that both can be formulated as solving an orthogonal procrustes problem for each element matrix. For purposes of this discussion, we assume training data of $X=[x_1, x_2, \ldots, x_N] \in \mathbb{R}^{d \times N}$. The discussion below individually addressed first the assumption that k=d, and then the discussion extends the solution to k≠d cases.

First, the problem of minimizing binarization loss for binary embedding is addressed. The optimization problem may be expressed as shown in Equation (10).

$$\underset{B,R}{\arg\min}(B, R)\|B - RX\|_F^2, \text{ s.t. } RR^T = I, \quad (10)$$

In Equation (10), where binary matrix $B=[b_1, b_2, \ldots, b_N] \in \{-1, 1\}^{d \times N}$, and $b_i$ is the binary code of $x_i$, i.e. $b_i$=sign $(Rx_i)$. In addition, the Kronecker structure is imposed on R. A local solution of Equation (3) may be found by alternating minimization. In instances where R is fixed, B is computed by a straightforward binarization based on definition. Alternatively, for those instances where B is fixed, and k=d (w<d case below) R is found by the orthogonal procrustes problem set forth in Equation (11):

$$\underset{R}{\arg\min}\|B - RX\|_F^2, \text{ s.t. } R^T R = I. \quad (11)$$

Next, with respect to quantization, we consider the Cartesian K-Means (ck-means) method. For ck-means, the input sample x is split into m subspaces, $x=[x^{(1)}; x^{(2)}; \ldots; x^{(m)}]$, and each subspace may be quantized to h sub-centers. In accordance with the example discussed below, a scenario is considered where all the sub-center sets have the same fixed cardinality. However, the present disclosure need not be so limited. For instance, the present disclosure may also be applied in a similar manner for sub-center sets with varying cardinalities.

Let $p=[p^{(1)}; p^{(2)}; \ldots; p^{(m)}]$, where $p^{(j)} \in \{0,1\}^h$, $\|p^{(j)}\|_1=1$. In other words, $p^{(j)}$ is an indicator of which sub-center $x^{(j)}$ is closest to. Let $C^{(j)} \in \mathbb{R}^{d \times h}$ be the jth sub-center matrix and $C \in \mathbb{R}^{d \times mh}$ be a center matrix which is formed by the concatenation (diagonal-wise) of all the sub-centers, as set forth in Equation (12):

$$C = \begin{bmatrix} C^{(1)} & & \\ & \ddots & \\ & & C^{(m)} \end{bmatrix}. \quad (12)$$

In ck-means, the center matrix C is parameterized by an orthogonal matrix $R \in \mathbb{R}^{d \times d}$ and a block diagonal matrix $D \in \mathbb{R}^{d \times mh}$. The optimization problem of ck-means may be written as Equation (13), $$\underset{R,P,D}{\arg\min}\|X - RDP\|_F^2, \text{ s.t. } R^T R = I. \quad (13)$$

Imposing the Kronecker structure on the orthogonal matrix R utilizing a similar alternating procedure. In instances where R is fixed, updating D and P may be equivalent to vector quantization in each subspace with k-means. The aforementioned approach is efficient because the number of centers may typically be small since the number of clusters for each subspace is always set to a small number (e.g., h=256). Updating R with fixed D and P may be approached as an orthogonal procrustes problem, as reflected in Equation (1).

$$\underset{R}{\arg\min}\|X - RDP\|_F^2, \text{ s.t. } R^T R = I. \quad (14)$$

Accordingly, for both approaches discussed above, an orthogonal procrustes problem may arise. For the aspects of the disclosure utilizing a Kronecker product and/or projection, the problem may be referred to as a Kronecker procrustes. The Kronecker procrustes may be shown below with respect to Equation (15):

$$\underset{R}{\arg\min}\|RX - B\|_F^2, \quad (15)$$

$$\text{s.t. } R = A_1 \otimes \ldots \otimes A_M, A_j^T A_j = I, j = 1, \ldots, M.$$

To solve the above optimization, an iterative method maybeutilizedto update each element matrix sequentially to find a local solution. The method may begin by rewriting $\|RX-B\|_F^2$ as Equation (16):

$$\left\|\left(\bigotimes_{j=1}^M A_j\right)X - B\right\|_F^2 = tr\left(\left(\left(\bigotimes_{j=1}^M A_j\right)X - B\right)^T\left(\left(\bigotimes_{j=1}^M A_j\right)X - B\right)\right) \quad (16)$$

$$= \|X\|_F^2 - 2tr\left(\left(\bigotimes_{j=1}^M A_j\right)XB^T\right) + \|B\|_F^2.$$

The second equality holds because Kronecker product may preserve orthogonality. Thus, the next step may be to maximize $tr((\bigotimes_{j=1}^M A_j)XB^T)$. Using the property of trace, it may be expressed as Equation (17):

$$tr\left(B^T\left(\bigotimes_{j=1}^M A_j\right)X\right) = \sum_{i=1}^N b_i^T\left(\bigotimes_{j=1}^M A_j\right)x_i, \quad (17)$$

In Equation (17), where $b_i$ and $x_i$ are the i-th column of matrix B and matrix X respectively. This problem may be solved by updating one element matrix at a time, while keeping all others fixed. Without loss of generality, consider updating $A_j$ as shown in Equation (18):

$$\underset{A_j}{\arg\min}\sum_{i=1}^N b_i^T(A_{pre} \otimes A_j \otimes A_{next})x_i \quad (18)$$

$$\text{s.t. } A_j^T A_j = I,$$

In Equation (18), where $A_{pre}=1 \otimes (\bigotimes_{i=1}^{j-1} A_i)$, and $A_{next}=(\bigotimes_{i=j+1}^M A_i) \otimes 1$. Let the dimension of $A_{pre}$, $A_{next}$, and $A_j$ be $k_{pre} \times d_{pre}$, $k_{next} \times d_{next}$ and $k_j \times d_j$, respectively. Also, $d_{pre} d_j d_{next}=d$ and $k_{pre} k_j k_{next}=k$.

According to characteristics associated with the Kronecker product, the objective function $A_j$ in Equation (18) may satisfy:

$$\sum_{i=1}^{N} b_i^T vec((A_j \otimes A_{next})mat(x_i, d_j d_{next}, d_{pre})A_{pre}^T). \quad (19)$$

Let $G_i=mat(x_i, d_j d_{next}, d_{pre})A_{pre}^T$, and $F_i=mat(b_i, k_j k_{next}, k_{pre})A_{pre}^T$. Then, Equation (19) can be expressed as:

$$\sum_{i=1}^{N} tr(F_i^T(A_j \otimes A_{next})G_i). \quad (20)$$

When updating one element matrix, the computational cost may come from three different sources. The first source, referred to here as S1, results from calculating a Kronecker projection of data with the fixed element matrices. The second source, referred to here as S2, results from calculating the product of projected data and codes. The third source, referred to here as S3, results from performing SVD to get the optimal element matrix. For instances where the element matrices may be large, the optimization bottleneck may be SVD. Alternatively, for instances where the element matrices may be small such as, for example, 2×2, performing SVD can be achieved in approximately constant time. The main computational cost therefore comes from S1 (O(Nd log d)) and S2 (O(Nd)). Since there are a total of $\log_{d_e} d$ element matrices, the computation complexity of the whole optimization is O(Nd log² d).

In the foregoing optimization, a randomized Kronecker projection was used as the initialization. For both binary embedding and quantization, the objective may decrease fast based on the proposed procedure. A satisfactory solution may be found within tens of iterations.

The approaches discussed above were discussed based on a scenario where k=d. However, aspects of the present disclosure may also be utilized for scenarios where k≠d. For instances where k≠d, the projection matrix R can be formed by the Kronecker product of non-square row/column orthogonal element matrices. In such instances, the Kronecker product may preserve the row/column orthogonality. For example, when k>d, the orthogonal procrustes optimization problem may be solved similarly as k=d. Alternatively, for example, when k<d, $R^TR \neq I$. Hence, the second equality in Equation (16) does not hold. Accordingly, $\|RX-B\|_F^2$ becomes:

$$tr(X^TR^TRX)-2tr(RXB^T)+\|B\|_F^2. \quad (21)$$

The problem may be relaxed by assuming that tr(X-TRTRX) is independent on R, same as in the k≥d case.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. Other steps may be provided, or steps may be eliminated, from the described flows, and other components may be added to, or removed from, the described systems. In some cases, multitasking and parallel processing may be advantageous.

The invention claimed is:

1. A computer-implemented method comprising:
   obtaining a plurality of content items;
   extracting a plurality of features from each of the plurality of content items;
   generating a feature vector for each of the extracted features in order to create a search space;
   generating a series of element matrices based upon the generated feature vectors, wherein each element matrix of the series of element matrices is associated with one or more relationships;
   enhancing the search space at least in part by transforming the series of element matrices into a structured matrix such that the transformation preserves the one or more relationships associated with each element matrix of the series of element matrices;
   receiving a search object;
   searching the enhanced search space based on the received search object; and
   providing one or more links to one or more content items that are responsive to the search object.

2. The method of claim 1, wherein the one or more relationships associated with the element matrices includes orthogonality.

3. The method of claim 1, wherein the one or more relationships associated with the element matrices includes a Euclidean distance.

4. The method of claim 1, wherein transforming the series of element matrices into the structured matrix further comprises:
   generating a Kronecker projection that is based in part on the application of a Kronecker product to a series of element matrices.

5. The method of claim 1, wherein searching the enhanced search space based on the received search object further comprises:
   extracting one or more features associated with the search object;
   generating a search object vector that is representative of the features of the search object;
   comparing the search object vector against the enhanced search space that includes the structured matrix; and
   identifying one or more content items that satisfy a predetermined relationship based upon the comparison.

6. The method of claim 1, wherein the series of element matrices are randomly generated based, at least in part, on the original Euclidean distance of a particular snapshot of a feature vector search space.

7. The method of claim 1, wherein transforming the series of element matrices into a structured matrix such that the transformation preserves the one or more relationships associated with each element matrix of the series of element matrices is achieved with a storage space complexity of $O(\log d)$ for d-dimensional data.

8. A system comprising:
   one or more computers and one or more storage devices storing instructions that are operable, when executed by the one or more computers, to cause the one or more computers to perform operations comprising:
   obtaining a plurality of content items;
   extracting a plurality of features from each of the plurality of content items;
   generating a feature vector for each of the extracted features in order to create a search space;
   generating a series of element matrices based upon the generated feature vectors, wherein each element matrix of the series of element matrices is associated with one or more relationships;
   enhancing the search space at least in part by transforming the series of element matrices into a structured matrix such that the transformation preserves the one or more relationships associated with each element matrix of the series of element matrices;
   receiving a search object;
   searching the enhanced search space based on the received search object; and
   providing one or more links to one or more content items that are responsive to the search object.

9. The system of claim 8, wherein the one or more relationships associated with the element matrices includes orthogonality.

10. The system of claim 8, wherein the one or more relationships associated with the element matrices includes a Euclidean distance.

11. The system of claim 8, wherein transforming the series of element matrices into the structured matrix further comprises:
   generating a Kronecker projection that is based in part on the application of a Kronecker product to a series of element matrices.

12. The system of claim 8, wherein searching the enhanced search space based on the received search object further comprises:
   extracting one or more features associated with the search object;
   generating a search object vector that is representative of the features of the search object;
   comparing the search object vector against the enhanced search space that includes the structured matrix; and
   identifying one or more content items that satisfy a predetermined relationship based upon the comparison.

13. The system of claim 8, wherein the series of element matrices are randomly generated based, at least in part, on the original Euclidean distance of a particular snapshot of a feature vector search space.

14. The system of claim 8, wherein transforming the series of element matrices into a structured matrix such that the transformation preserves the one or more relationships associated with each element matrix of the series of element matrices is achieved with a storage space complexity of $O(\log d)$ for d-dimensional data.

15. A non-transitory computer-readable medium storing software comprising instructions executable by one or more computers which, upon such execution, cause the one or more computers to perform operations comprising:
   obtaining a plurality of content items;
   extracting a plurality of features from each of the plurality of content items;
   generating a feature vector for each of the extracted features in order to create a search space;

generating a series of element matrices based upon the generated feature vectors, wherein each element matrix of the series of element matrices is associated with one or more relationships;

enhancing the search space at least in part by transforming the series of element matrices into a structured matrix such that the transformation preserves the one or more relationships associated with each element matrix of the series of element matrices;

receiving a search object;

searching the enhanced search space based on the received search object; and providing one or more links to one or more content items that are responsive to the search object.

16. The computer-readable medium of claim 15, wherein the one or more relationships associated with the element matrices includes orthogonality.

17. The computer-readable medium of claim 15, wherein the one or more relationships associated with the element matrices includes a Euclidean distance.

18. The computer-readable medium of claim 15, wherein transforming the series of element matrices into the structured matrix further comprises:

generating a Kronecker projection that is based in part on the application of a Kronecker product to a series of element matrices.

19. The computer-readable medium of claim 15, wherein searching the enhanced search space based on the received search object further comprises:

extracting one or more features associated with the search object;

generating a search object vector that is representative of the features of the search object;

comparing the search object vector against the enhanced search space that includes the structured matrix; and identifying one or more content items that satisfy a predetermined relationship based upon the comparison.

20. The computer-readable medium of claim 15, wherein the series of element matrices are randomly generated based, at least in part, on the original Euclidean distance of a particular snapshot of a feature vector search space.

* * * * *

UNITED STATES PATENT AND TRADEMARK OFFICE
CERTIFICATE OF CORRECTION

| | |
|---|---|
| PATENT NO. | : 10,394,777 B2 |
| APPLICATION NO. | : 14/951909 |
| DATED | : August 27, 2019 |
| INVENTOR(S) | : Yu et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 941 days.

Signed and Sealed this
Second Day of June, 2020

Andrei Iancu
*Director of the United States Patent and Trademark Office*